Mar. 20, 1923.
H. L. MARTIN ET AL.
VEHICLE WHEEL.
FILED SEPT. 14, 1921.
1,448,855.
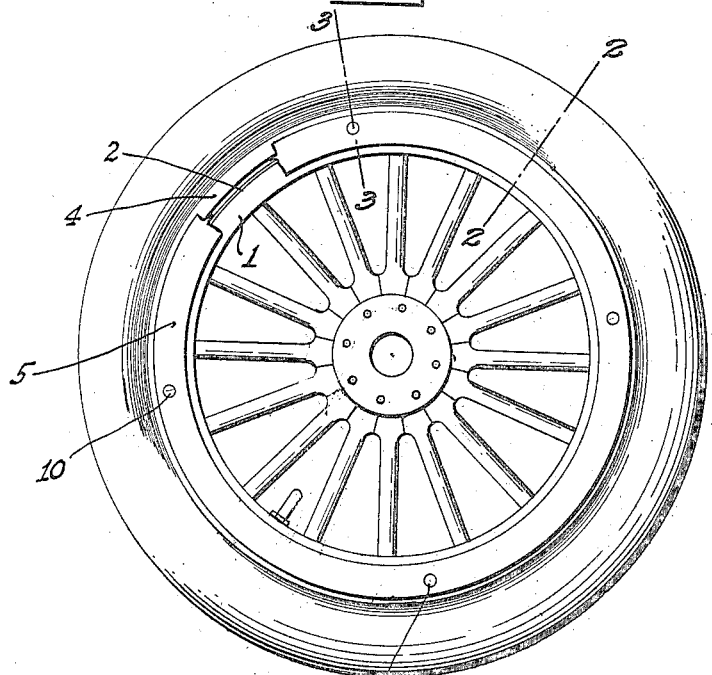
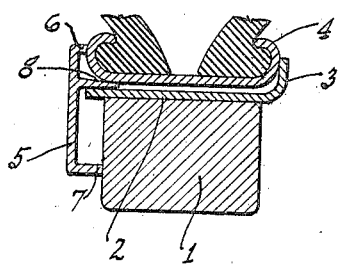
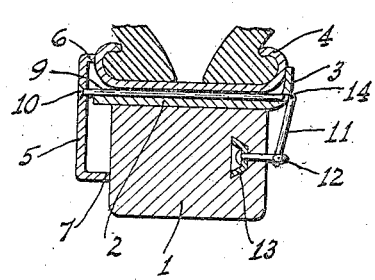
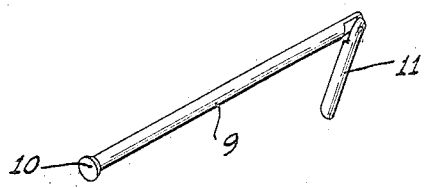
Inventors
Harry L. Martin
John G. Noah
By James B. Boggan
Watson E. Coleman Attorneys Patented Mar. 20, 1923.

1,448,855

UNITED STATES PATENT OFFICE.

HARRY L. MARTIN, OF MEMPHIS, TENNESSEE, AND JOHN GUY NOAH AND JAMES B. BOGGAN, OF AMORY, MISSISSIPPI.

VEHICLE WHEEL.

Application filed September 14, 1921. Serial No. 500,573.

*To all whom it may concern:*

Be it known that we, HARRY L. MARTIN, a citizen of the United States, residing at Memphis, in the county of Shelby and State of Tennessee, and JOHN GUY NOAH and JAMES B. BOGGAN, also citizens of the United States, residing at Amory, in the county of Monroe and State of Mississippi, have invented certain new and useful Improvements in Vehicle Wheels, of which the following is a specification, reference being had to the accompanying drawings.

This invention relates to vehicle wheels and more particularly to a novel means for attaching demountable tire rims thereto.

One of the principal objects of the invention is to provide a simple and efficient means for attaching demountable rims to the felly of an ordinary wheel which will obviate the use of bolts and similar unsightly devices and which will produce a neat appearance.

Another object of the invention is the provision of a device for attaching the tire rims to the felly of the vehicle wheel in such manner that they may be readily removed or clamped into place without the use of bolts, and in such manner that the rim will be held properly spaced from the felly so as to eliminate sticking or freezing of the rim to the felly.

Further objects of the invention will appear as the following specific description is read in connection with the accompanying drawings which form a part of this application and in which:

Figure 1 is an elevation of the wheel with parts broken away,

Figure 2 is a detail sectional view taken on the line 2—2 of Figure 1,

Figure 3 is a similar section taken on the line 3—3 of Figure 1, and

Figure 4 is a perspective view of the ring attaching member removed.

Referring more particularly to the drawing, 1 represents the felly of an ordinary vehicle wheel similar to that used on automobiles, which is provided on its outer face with an annular rim 2, having an upstanding flange 3 on one side against which the inner edge of the demountable rim 4 abuts. The construction just described is old and well known and forms no part of the present invention. Our improved device for attaching the demountable rim 4 to the felly comprises an annular ring 5 having inwardly extending flanges 6 and 7 upon opposite side edges, the former adapted to engage the demountable rim 4 and the latter adapted to engage the felly. The ring is also provided with a rib 8 extending around its circumference positioned between the flanges 6 and 7 and being substantially wedge shaped in cross section. This rib is adapted to enter the space between the demountable rim 4 and the wheel rim 2 on the felly, as shown in Figure 2, so that the demountable rim may be held properly spaced from the wheel rim, as indicated.

Passing through the ring at suitable intervals, are the locking members, each consisting of an elongated shank 9 having a head 10 at one end thereof which is counter-sunk into the outer face of the rim, and at its opposite end with a swiveled or pivoted locking lever 11 adapted to be engaged by the hooked end 12 of the locking device 13 which is rotatably mounted in the felly, as shown in Figure 3. The shanks 9 pass through apertures 14 in the upstanding flange 3 of the wheel rim 2, and when the lever 11 is thrown downwardly, the shank 9 is pulled through the space between the demountable rim and the main rim, thus drawing the ring 5 tightly into engagement with the felly and the demountable rim, as will be readily understood. When the locking lever is in proper position, the member 13 is turned so as to bring the hook end 12 over the lever and thus lock the parts in position. If desirable, the hook member 13 may be held stationary in the rim and the lever 11 snapped into engagement with the hook, thus locking the parts in position.

We claim:

The combination with a wheel felly having a rim mounted thereon provided with an annular flange on one side, of a demountable rim concentrically surrounding and spaced from the first rim, an annular ring engaging one side of the felly and one of the flanges of the demountable rim, a plurality of bolts engaging through the annular ring and passing between the two rims and through the single flange of the first rim, said bolts being arranged at intervals, and a plurality of locking levers, one pivotally connected to the extremity of each bolt immediately adjacent the exterior of the single flange, said locking levers adapted to be disposed radially when in locked positions, and means swivelled to one side of the rim and adapted to be operated to overlie the locking levers to hold them in said locking positions, thereby holding the demountable rim securely in position.

In testimony whereof we hereunto affix our signature.

HARRY L. MARTIN.
JOHN GUY NOAH.
JAMES B. BOGGAN.